(12) United States Patent
Ha et al.

(10) Patent No.: US 6,530,838 B2
(45) Date of Patent: Mar. 11, 2003

(54) GAME PAD CONNECTABLE TO PERSONAL PORTABLE TERMINAL

(75) Inventors: Dong-Kook Ha, Seoul (KR); Hwan-Gi Kim, Seoul (KR)

(73) Assignee: Mobilink Telecom Co., Ltd. (KR)

( * ) Notice: Subject to any disclaimer, the term of this patent is extended or adjusted under 35 U.S.C. 154(b) by 0 days.

(21) Appl. No.: 09/878,593

(22) Filed: Jun. 11, 2001

(65) Prior Publication Data

US 2002/0155890 A1 Oct. 24, 2002

(30) Foreign Application Priority Data

Apr. 18, 2001 (KR) ............................................. 01-11031
Jun. 7, 2001 (KR) ............................................. 01-31774

(51) Int. Cl.[7] .......................... A63F 13/00; A63F 9/24; G06F 17/00; G06F 19/00
(52) U.S. Cl. .............................. 463/36; 463/37; 463/47; 345/169
(58) Field of Search .............................. 463/36, 37, 47, 463/38; 341/20, 22; 200/61.1; 345/168, 169

(56) References Cited

U.S. PATENT DOCUMENTS

2001/0012802 A1 * 8/2001 Nishiumi et al. ............. 463/37
2001/0016517 A1 * 8/2001 Nishiumi et al. ............. 463/36
2002/0020789 A1 * 2/2002 Li ............................. 248/175

OTHER PUBLICATIONS

"New GamePad by WorldWide Widget Works Now Shipping," Business Wire, Dec. 19, 2000, 1 page.*
Zach, Robert, "WorldWideWidgetWorks Palm GamePad Review," www.palminfocenter.com, Mar. 26, 2001, 5 pages.*
Airgamer, "Airgamer supports the WaSP Browser Upgrade initiative," www.airgamer.com, 2 pages.*
Strietelmeier, Julie, "Official Gadgeteer Hands On Review: SnapNPlay Visor Shock Vibration Game Pad," www.the-gadgeteer.com, Jan. 31, 2002, 3 pages.*
Strietelmeier, Julie, "Official Gadgeteer Hands On Review: GamePad for the Palm III and VII series PDAs," www.the-gadgeteer.com, Dec. 10, 2000, 3 pages.*
Handspring, "TT Tech announces the Snapon series including the SnapType & SnapNPlay for the Handspring Visor," www.handspring.com, Jun. 26, 2001, 2 pages.*

* cited by examiner

Primary Examiner—Denise L. Esquivel
Assistant Examiner—Marc Norman
(74) Attorney, Agent, or Firm—Hayes Soloway P.C.

(57) ABSTRACT

There is provided a game pad connectable to a personal portable terminal. Each of a left handle and a right handle has a plurality of key buttons in the game pad. A mounting portion is formed between the handles and holds the personal portable terminal. A guide rib is formed along the upper ends of both sidewalls of the mounting portion, for guiding both ends of the personal portable terminal. A connector is formed on an end portion of the mounting portion to be electrically connected to an interface connector of the personal portable terminal and selectively detachable from the personal portable terminal.

5 Claims, 5 Drawing Sheets

GAME PAD CONNECTABLE TO PERSONAL PORTABLE TERMINAL

PRIORITY

This application claims priority to two applications, the one entitled "Game Pad Connected To Personal Digital Assistant" filed in the Korean Industrial Property Office on Apr. 18, 2001 and assigned Serial No. 2001-11031, and the other entitled "Game Pad Connectable To Personal Portable Terminal" filed in the Korean Industrial Property Office on Jun. 7, 2001 and assigned Serial No. 2001-31774, the contents of which are hereby incorporated by reference.

BACKGROUND OF THE INVENTION

1. Field of the Invention

The present invention relates generally to an electronic game device, and in particular, to a game pad connectable to a personal portable terminal such as a mobile phone and a PDA (Personal Digital Assistant) for playing a game.

2. Description of the Related Art

As personal portable terminals like mobile phones and PDAs have increasingly been popular, diverse functions and designs are embodied in the personal portable terminals. They become smaller, more lightweight, and more diverse in function.

In order to satisfy the customers' diverse demands, the personal portable terminals must be less bulky and operate given functions (e.g., games, stock quotes, and digital camera).

Along with the trends, data communication is added to the personal portable terminals. Furthermore, with the introduction of advanced additional functions like PC (Personal Computer) synchronization and GPS (Global Positioning System), the personal portable terminals become composite terminals.

A wide LCD (Liquid Crystal Display) module is provided on the frontal surface of a body in a personal portable terminal to help data communication. As a result, conventional key buttons are replaced with scroll keys and the LCD module is reconfigured to operate in a touch screen way. Therefore, a user enters data by touching the LCD module directly.

This personal portable terminal is very inconvenient to manipulate for a game. The inconvenience is worse when key buttons are scaled down and operate on a scroll basis.

SUMMARY OF THE INVENTION

An object of the present invention is, therefore, to provide a game pad with a plurality of key buttons, connectable to a personal portable terminal, which is easy to manipulate for an electronic game.

Another object of the present invention is to provide a detachable game pad which is easily removable from a PDA (Personal Digital Assistant) for portability.

A further object of the present invention is to provide a game pad for increasing interest in using a personal portable terminal and playing an electronic game.

The foregoing and other objects can be achieved by providing a game pad connectable to a personal portable terminal. According to one aspect of the present invention, each of a left handle and a right handle has a plurality of key buttons in the game pad. A mounting portion is formed between the handles and holds the personal portable terminal. A guide rib is formed along the upper ends of both sidewalls of the mounting portion, for guiding both ends of the personal portable terminal. A connector is formed on an end portion of the mounting portion to be electrically connected to an interface connector of the personal portable terminal and selectively detachable from the personal portable terminal.

According to another aspect of the present invention, an interface interfaces the game pad to the personal portable terminal in the game pad. A keypad has a plurality of keys, for generating key data to a pressed key. A vibrator has a vibration motor, for generating vibrations upon receipt of a first operation control signal. A voice processor has a sound source chip and generates effect sounds upon receipt of a second operation control signal. A controller controls the operations of the function blocks of the game pad, feeds the key data received from the keypad to the personal portable terminal via the interface, and outputs the operation control signals to the vibrator and the voice processor according to a sound signal and a vibration signal received from the personal portable terminal via the interface.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constrictions are not described in detail since they would obscure the invention in unnecessary detail.

Figure 1:
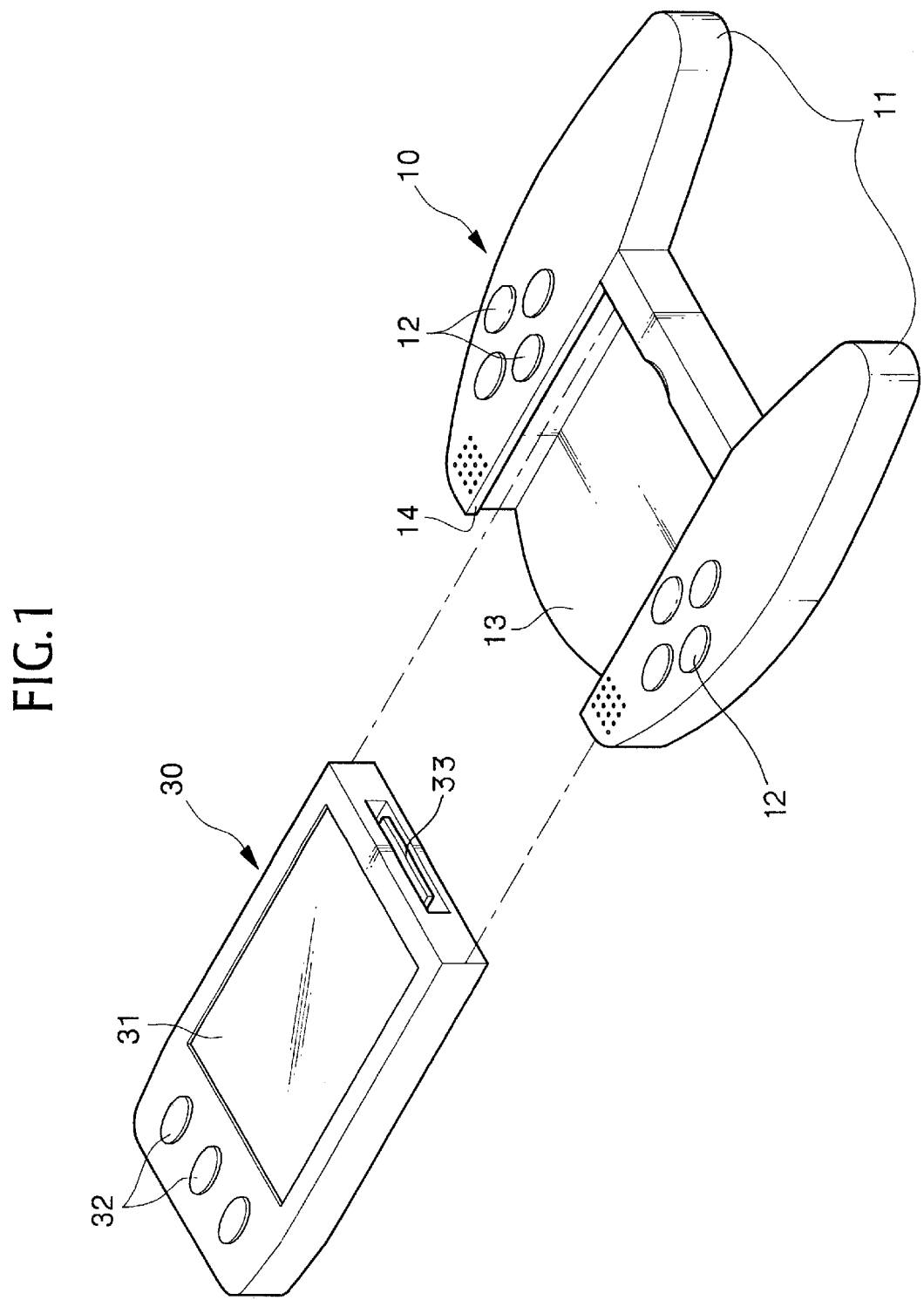
FIG. 1 is an exploded perspective view of a PDA and a game pad according to a preferred embodiment of the present invention.
Figure 2:
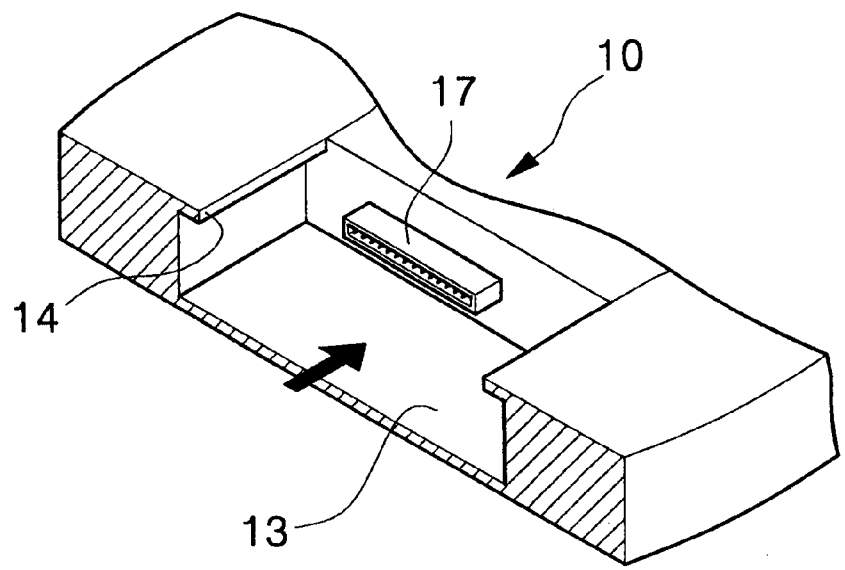
FIG. 2 is a partial perspective view illustrating an important portion of the game pad according to the preferred embodiment of the present invention.
Figure 3:
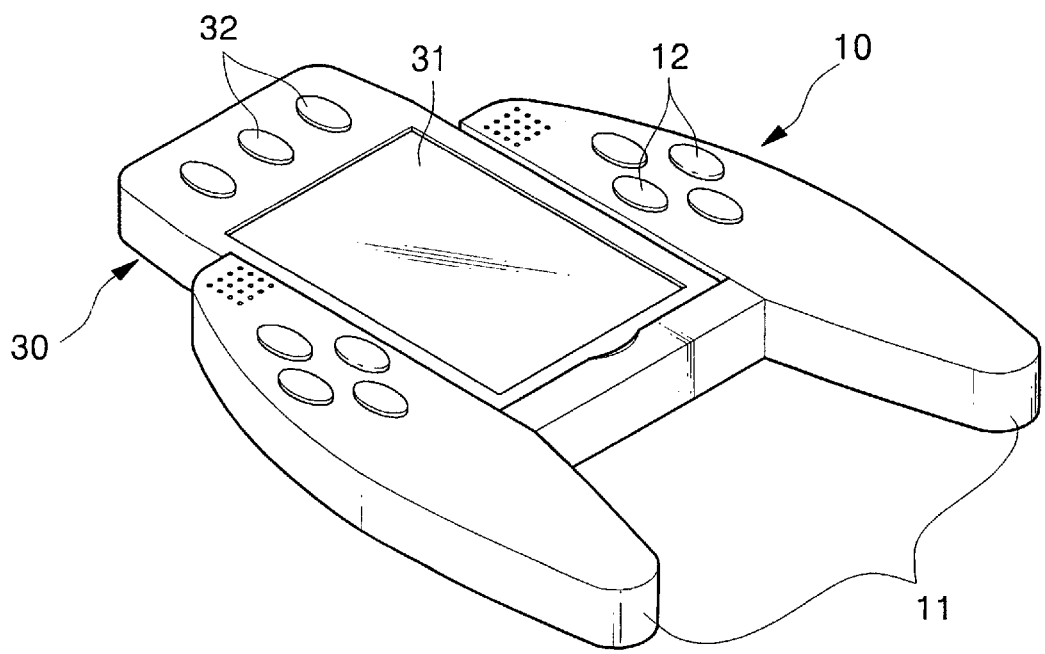
FIG. 3 is a perspective view of the PDA and the game pad in combination according to the preferred embodiment of the present invention.

FIG. 1 is an exploded perspective view of a PDA and a game pad, FIG. 2 is a partial perspective view illustrating an important portion of the game pad, and FIG. 3 is a perspective view of the PDA and the game pad in combination according to a preferred embodiment of the present invention. A PDA 30 and a game pad 10 removable from the PDA 30 are shown.

Referring to FIGS. 1, 2, and 3, the PDA 30 has a wide LCD 31 on its upper surface, for displaying input data and Tirelessly transmitted/received data. A plurality of buttons 32 are protruded at one side of the LCD 31, for entering data. An interface connector 33 is provided at one end of the PDA 30 to exchange data with an external device.

The game pad to, from which the PDA 30 can be detached, includes handles 11 with a plurality of key buttons 12 at both sides, a mounting portion 13 between the two handles 11, for mounting the PDA 30 thereon, and a connector 17 to be electrically connected to the interface connector 33 of the PDA 30. The connector 17 can be connected to a PC.

A guide rib 14 is protruded from the upper ends of both sidewalls of the mounting portion 13 to guide both ends of the PDA 30. When the PDA 30 is mounted on the mounting portion 13, the both ends of the PDA 30 slide along the guide rib 14. If the PDA 30 is completely mounted in an arrow direction in FIG. 2, the interface connector 33 of the PDA 30 is electrically connected to the connector 17 of the game pad 10 so that the PDA 30 can be operated by means of the buttons 12 on the handles 11.

Figure 4:
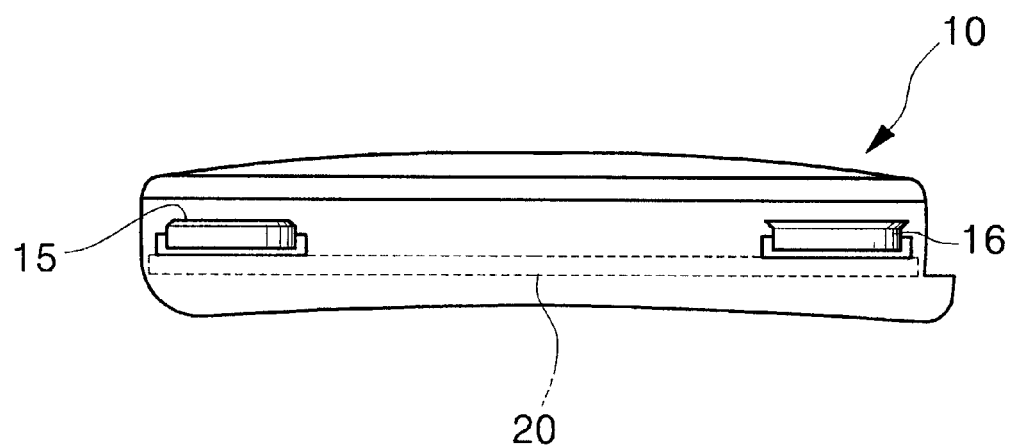
FIG. 4 is a schematic view illustrating the interior of the game pad according to the preferred embodiment of the present invention.

FIG. 4 is a schematic view illustrating the interior structure of the game pad 10 according to the preferred embodiment of the present invention. Referring to FIG. 4, a PCB (Printed Circuit Board) 20 can be installed in the game pad 10 to be electrically connected to the connector 7. At least one vibrator 15 is provided inside the handles 11 of the game pad 10 so that it selectively vibrates when a user manipulates the PDA 30. At least one sound source reproducer 16 is built inside the handles 11 so that the user enjoys sounds when he manipulates the PDA 30 through the game pad 10. A predetermined speaker or sound source chip can be used as the sound source reproducer 16. The sound source reproducer 16 and the vibrator 15 can be mounted on the PCB 20. A flexible printed circuit (FPC) may be used instead of the PCB 20.

According to a feature of the present invention, the game pad provides vibrations and sound effects according to games, which other auxiliary game devices like a joystick cannot afford. This will be described in detail referring to FIG. 5.

Figure 5:
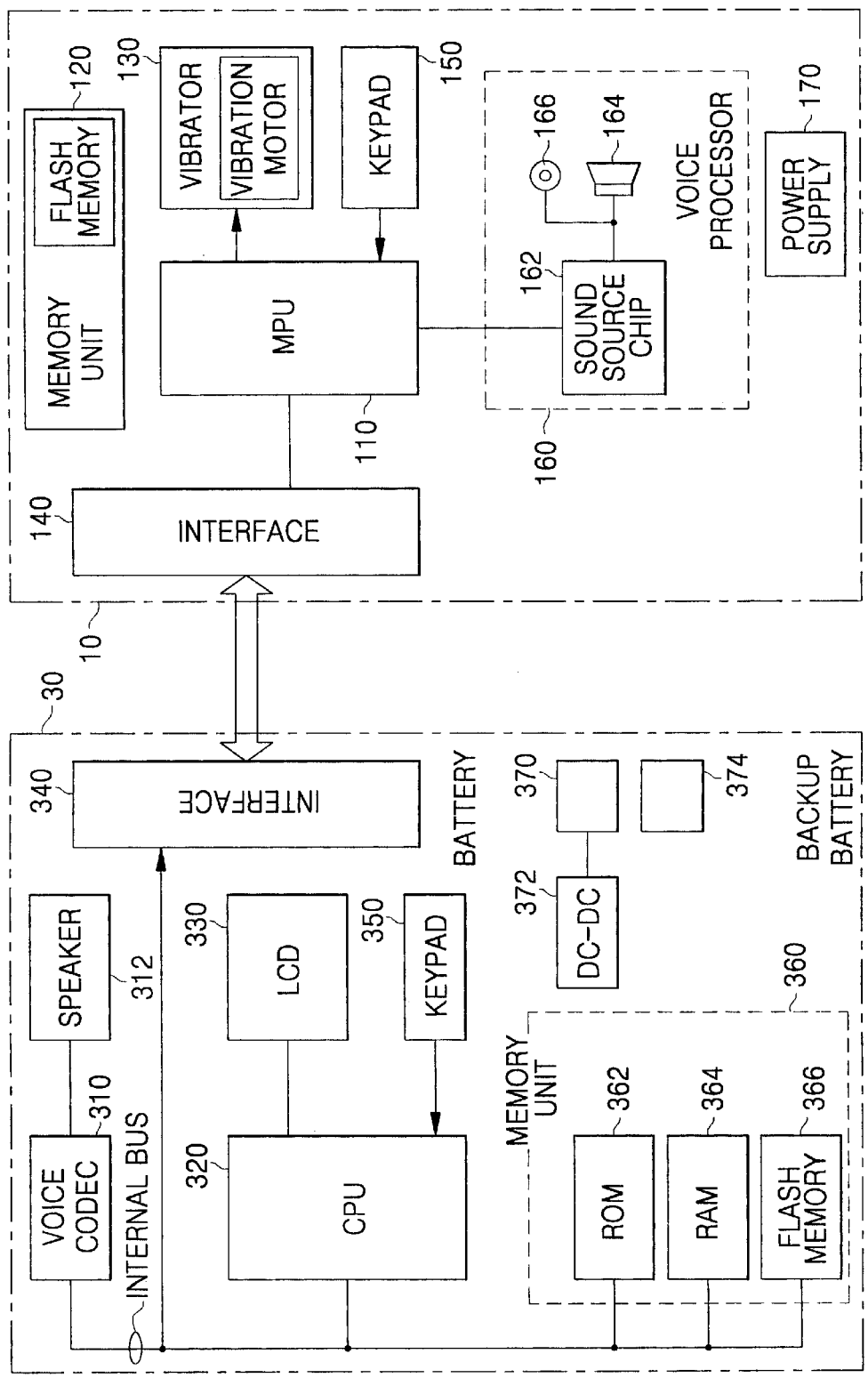
FIG. 5 is a block diagram of the PDA and the game pad according to the preferred embodiment of the present invention.

FIG. 5 is a block diagram of the PDA and the game pad according to the preferred embodiment of the present invention.

As to the PDA 30, components are connected to one another in buses of the PDA 30. Among them, a CPU (Central Processing Unit) 320 is a main controller that provides overall control to the PDA 30 The CPU 320 also controls image display on an LCD 330.

A memory 360 includes a ROM (Read Only memory) 362, a RAM (Random Access Memory) 364, and a flash memory 366. The ROM 362 stores a code group for controlling hardware operation permanently. The RAM 364 is a writable volatile memory and used mainly as a working place for the CPU 320. The flash memory 366 is an erasable non-volatile memory used to maintain important data of the PDA 30, for example.

A voice CODEC 310 is an exclusive circuit for compressing/decompressing voice data. For example, voice data like sounds generated during playing a game is decompressed by the voice CODEC 310 and output through a speaker 312.

An interface 340 interfaces the PDA 30 with external devices (e.g., a PC or the game pad 10) and may include a serial port, a UART (Universal Asynchronous Receiver-Transmitter) port, and a USB (Universal Serial Bus) port.

The PDA 30 has a battery 370 as a main power source. The battery 370 is a secondary battery such as a lithium-ion battery. A DC-DC converter 372 converts the level of a voltage at the output port of the battery 370. A backup battery 374 can be additionally provided.

Besides the above-described components, the PDA 30 can have blocks for a PHS (Personal Handyphone System) function, which is known to those skilled in this field and beyond the scope of the present invention. Thus, its description is omitted here.

As to the game pad 10, an interface 140 interfaces the game pad 10 with external devices (e.g., a PC or the PDA 30) and includes a serial port, a USB port, and a Bluetooth module.

A keypad 150 includes a plurality of buttons and directional keys. When the user presses a key, the keypad 150 generates corresponding key data and feeds it to an MPU (Main Processing Unit) 110

The MPU 110 is a controller that provides overall control to the game pad 10. The MPU 110 provides key data received from the keypad 150 to an external device, for example, the PDA 30 through the interface 140.

The PDA 30 has a battery 370 as a main power source. The battery 370 is a secondary battery such as a lithium-ion battery. A DC-DC converter 372 converts the level of a voltage at the output port of the battery 370. A backup battery 374 can be additionally provided.

According to the present invention, the game pad 10 has a vibrator 130 and a voice processor 160. The vibrator 130 has a vibration motor and drives the vibrator to vibrate the game pad 10 under the control of the MPU 110. The voice processor 160 includes a sound source chip (e.g., YMU759 of Yamaha) 162, a speaker 164, and an earphone connection jack 166 and generates effect sounds through the speaker 164 or an earphone (not shown) connected to the earphone connection jack 166 under the control of the MPU 110. That is, the MPU 110 controls the operation of the voice processor 16 or the vibrator 130 according to a sound signal or a vibration signal received from the PDA 30 through the interface 140 during playing a game.

To do so, events at which sound signals and vibration are to be generated are defined in each game program. The PDA 30 transmits the sound signals and vibration signals to the game pad 10 during playing a game.

Thus, the user can enjoy vibrations and effect sounds via the speaker 164 or the earphone.

The game pad 10 can have a memory unit 120 for storing the operation program of the MPU 110 and downloaded game programs. The game pad 10 is connected to a PC, a PDA, or a mobile phone via the interface 140, downloads game programs, and stores them in the memory unit 120. It is preferable to store the operation program of the MPU 110 in the flash memory. The operation program is constructed in a library format so that it is easily amended and upgraded.

The game pad 10 may have a power supply 170 like a battery. The power supply 170 is comprised of a chargeable battery.

As described above, when the game pad in accordance with the present invention is connected to a personal portable terminal, it is easy to use because it has a plurality of key buttons. Also, the game pad is portable since it is detachable from the terminal. Furthermore, the game pad increases the interest in playing an electronic game using a personal portable terminal through vibrations and effect sounds.

While the invention has been shown and described with reference to a certain preferred embodiment thereof, it is a mere exemplary application. For example, the game pad of the present invention is applicable to an IMT-2000 terminal or a mobile phone as well as a PDA. A specific key (or specific keys in combination) in the keypad of the game pad can be preset to generate a command requesting 90- or 180-degree rotation of a game display on the LCD of a personal portable terminal connected to the game pad. According to the type of a personal portable terminal, the position of a connector is determined and the fame pad is connected to the personal portable terminal in a corresponding position, to thereby allow a user to view a display appropriately. Therefore, it will be understood by those skilled in the art that various changes in form and details may be made therein without departing from the spirit and scope of the invention as defined by the appended claims.

What is claimed is:

1. A game pad connectable to a personal portable terminal, comprising:

an interface for interfacing the game pad to the personal portable terminal;

a keypad having a plurality of keys, for generating key data to a pressed key;

a vibrator having a vibration motor, for generating vibrations upon receipt of a first operation control signal;

a voice processor having a sound source chip, for generating effect sounds upon receipt of a second operation control signal; and a controller for controlling operation of function blocks of the game pad, feeding the key data received from the keypad to the personal portable terminal via the interface, and outputting the operation control signals to the vibrator and the voice processor according to a vibration signal and a sound signal, respectively, from the personal portable terminal via the interface.

2. The game pad of claim 1, wherein the voice processor further includes an earphone connection jack for outputting the effect sounds to an earphone.

3. The game pad of claim 1, further comprising a memory unit for storing an operation program of the controller and downloaded game programs.

4. The game pad of claim 3, wherein the operation program of the controller is stored in a library format in a flash memory of the memory unit.

5. The game pad of claim 1, wherein the personal portable terminal is a PDA.

* * * * *